United States Patent [19]

Dawawala

[11] 3,908,701
[45] Sept. 30, 1975

[54] THREE STAGE, DOUBLE TAPERED DASHPOT

[75] Inventor: Suryakant K. Dawawala, Glen Riddle, Pa.

[73] Assignee: Westinghouse Electric Corporation, Pittsburgh, Pa.

[22] Filed: June 22, 1973

[21] Appl. No.: 372,721

[52] U.S. Cl. ................ 137/630.15; 91/396; 251/54
[51] Int. Cl. ............................................. F16k 31/12
[58] Field of Search ........ 91/25, 396, 405; 137/630, 137/630.14, 630.15; 251/48, 54

[56] References Cited
UNITED STATES PATENTS

| | | | |
|---|---|---|---|
| 1,096,220 | 5/1914 | Brooks | 137/630.15 |
| 1,594,177 | 7/1926 | Knauf | 251/48 X |
| 2,598,446 | 5/1952 | Schneider | 91/396 X |
| 2,761,424 | 9/1956 | Hopkins | 251/48 X |
| 3,495,501 | 2/1970 | Jensen | 91/396 X |
| 3,531,078 | 9/1970 | Hose et al. | 251/54 |

Primary Examiner—Robert G. Nilson
Attorney, Agent, or Firm—G. M. Medwick

[57] ABSTRACT

A fast operating valve device for a pressurized fluid line. The valve comprises a body member having a flexible main valve plug movable from an open to a seated position within said body member. A pilot plug movable from an open to a seated position is disposed within the body member. An elongated stem effects the seating of both the main valve plug and the pilot plug. The high impact velocities of the main valve plug and the pilot plug are slowed by a three stage, double tapered dashpot arrangement. The dashpot has a pressure tight cylinder, filled with a hydraulic fluid, with a piston movably disposed therein. A control shaft is connected to the piston and to the elongated stem. The cylinder is divided into a first and a second compartment by a separator wall having an opening of a predetermined diameter therein. A first and a second snubber are spaced an axial distance apart on the control shaft. As the main plug moves to the seated position, the first snubber compresses the hydraulic fluid disposed in the cylinder and dampens the velocity of the main plug. As the pilot plug moves to the seated position at a predetermined later time, the second snubber compresses the hydraulic fluid in the cylinder so as to dampen the closing velocity of the pilot plug.

7 Claims, 7 Drawing Figures

THREE STAGE, DOUBLE TAPERED DASHPOT

CROSS-REFERENCES TO RELATED APPLICATIONS

The subject matter disclosed herein is disclosed but not claimed in the copending application of T. L. Dresner, Ser. No. 372,720, being filed concurrently herewith.

BACKGROUND OF THE INVENTION

1. Field of the Invention

This invention relates to a nuclear steam turbine system, and in particular, to a fast operating valve utilized in the nuclear steam turbine system.

2. Description of the Prior Art

A conventional steam turbine power plant generally comprises a steam generator, a high pressure turbine element, a reheater section, a low pressure turbine element, and a feed pump. In the conventional power plant, the flow of steam from the steam generator to the high pressure turbine element is controlled by a main turbine stop valve and at least one control valve disposed on the high pressure turbine element. The steam flow from the reheater to the lower pressure turbine element is controlled by an intercept valve. The low pressure and high pressure turbine elements are mechanically linked to an electrical generator which supplies electrical energy to an associated load.

The control valve is managed by appropriate control means and regulates the volume of steam flow that enters the high pressure turbine element. The turbine stop valve is a one piece valve member controlled by appropriate governors and moves from a wide-open to a closed position whenever the turbine reaches a predetermined overspeed condition. The overspeed condition may be caused by a variety of malfunctions in the system, such as sudden loss of load in the generator electrical system or a failure of a component in the steam supply system.

If, for example, the associated load in the generator electrical system were suddenly lost, the turbine elements would undergo a sudden increase in rotating speed. If this overspeed condition were allowed to proceed unchecked, the turbine would be destroyed by excessive centrifugal force, damaging not only the rotating elements, but the turbine casing and associated elements as well.

In order to prevent this occurrence, the turbine control system is usually constructed in such a way that the detection of an overspeed condition will actuate the turbine stop valve. The actuator will move the turbine stop valve from its normally open position to the seated position. Seating of the turbine stop valve prevents any additional high temperature and high energy steam from the steam generator from entering the high pressure turbine elements.

In order to prevent the overspeed condition above described, it is imperative that the turbine stop valve be capable of quickly moving from a normally open to a seated position in response to a predetermined signal from the turbine control means.

However, the trend toward construction of larger nuclear steam turbine system utilizing greater volumes of steam to achieve higher and higher output energies requires a larger and more massive valve to accomplish the stop function. Attendant upon the quick closing of these larger, more massive valves is the higher impact energies and velocities generated by moving the valves from a wide-open to a seated position.

In the prior art, nuclear steam power plants utilized a single-piece stop valve construction. Although valves having a two piece plug construction were utilized with fossil fuel systems, these valves were not applicable for use with a nuclear steam system. For example, for the fossil fuel application, the valve is considerably smaller and less massive, and the closing stroke of the pilot plug considerably less. Therefore, in the prior art fossil fuel systems, considerations as to energy absorption and closing velocities are not as critical as for valves used in nuclear steam systems.

The movement of the valve plug in the short time period allotted for the closing of the stop valve, usually 200 milliseconds, coupled with the more massive valve construction, requires that precautions be taken in absorb the high impact energies and dampen the high impact velocities generated by moving so large a mass in so short a time.

SUMMARY OF THE INVENTION

This invention relates to an improved valve device for utilization in a pressurized fluid line. The combined throttle-stop valve is capable of quickly closing from a normally open to a seated position. The throttle-stop valve comprises a body member having an inlet port and an outlet port therein, and a two piece valve plug member movement disposed from an open to a seated position within the body member. The two piece valve plug member is comprised of a pilot valve plug and a flexible main valve plug, both valve plugs being regulated by appropriate control governors.

The main valve plug is a flexible, substantially hemispherical member having a hollow shank attached thereto. The interior of the shank defines a first pressure-tight chamber. The shank member is movably diposed within a second high presssure chamber defined by the interior of the body member. The flexible main plug has a central axial opening extending therethrough, and the shank member is attached to the hemispherical main plug adjacent this opening.

A pilot plug is movably disposed from an open to a seated position within the hollow shank member of the main plug. A pilot plug seat is disposed in the main valve plug adjacent the opening therein. An elongated stem is attached to the pilot plug and extends coaxially through the shank member of the main plug and axially through the body of the valve. The pilot plug stem is connected by a suitable linkage to a pressurized actuator and closing spring assembly. The pressurized actuator holds both the main valve plug and the pilot valve plug in the normally open position until released by a predetermined emergency signal. Upon release of the pressurized actuator holding force, the closing spring moves the main valve and the pilot valve plugs to the seated position.

A third, low pressure chamber, isolated from the shank chamber and the second high pressure chamber, is defined by the interior of the body member.

Means for holding the pilot plug to the main plug during the closing stroke of the main valve plug are provided. The holding means are released when the main valve plug is seated, permitting the closing spring to close the pilot plug after the main plug has been seated.

A three stage double snubber dashpot arrangement is attached to the actuator means and slows the velocities of the main valve plug and the pilot plug just before seating. The flexibility of the main valve plug permits the main valve plug to deflect upon impact to absorb the high energies attendant upon the seating of the quick-closing main valve plug with the body member. In addition, the flexibility of the main valve permits it to deflect to absorb the high impact energies generated by the seating of the pilot plug as the plug seats over the opening in the main valve plug.

It is an object of this invention to provide a throttle-step valve capable of closing quickly from a normally open to a fully seated position during emergency trip conditions or when the turbine reaches a predetermined overspeed condition. The valve has a flexible main plug member able to absorb the high impact energies generated by a quick-closing action. It is desirable, and, therefore, a further object of this invention, to provide a valve plug able to move quickly from a wide-open to a seated position yet dampen the high velocities attendant upon the quick-closing action.

It is a further object of this invention to provide a valve having a flexible main valve plug and a pilot plug coaxial therewith, with suitable holding means to maintain attachment between the pilot plug and the main valve plug during the closing of the main valve plug.

BRIEF DESCRIPTION OF THE DRAWINGS

The invention will be more fully understood from the following detailed description of an illustrative embodiment taken in connection with the accompanying drawings, in which.

DESCRIPTION OF THE PREFERRED EMBODIMENT

Figure 1:
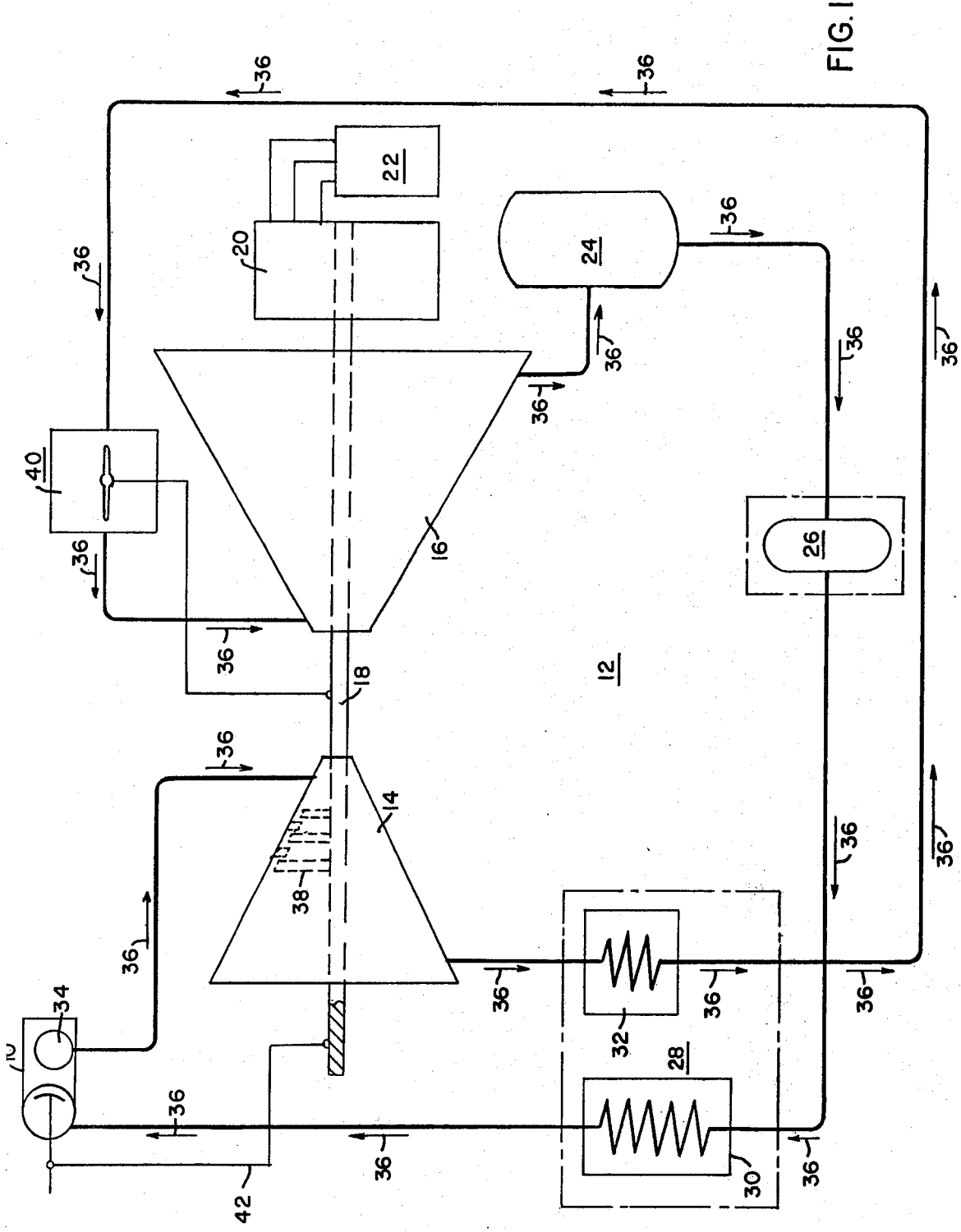
FIG. 1 is a diagrammatic view indicating the location of a combined turbine throttle-stop valve embodying the teachings of this invention and utilized in a nuclear steam turbine system.

Throughout the following description, similar reference characters refer to similar elements in all figures of the drawings.

Referring first to FIG. 1, a quick-closing turbine stop valve 10 having a throttling capability, and constructed according to the teachings of this invention, is illustrated as applied to a nuclear steam turbine power plant 12. The nuclear steam turbine power plant 12 has a high pressure turbine element 14 and a low pressure turbine element 16 connected together on a common shaft 18 as shown in the drawing. The shaft 18 mechanically links the turbine elements 14 and 16 to an electrical generator 20 which supplies electrical energy to an associated electrical load 22.

The low pressure turbine element 16 may exhaust into still lower pressure turbines, or directly into a condenser 24. The condenser 24 produces a condensate which is returned by a boiler feed pump 26 to a steam generator 28, in this case a nuclear steam generator. The steam generator 28 has a primary steam generator section 30 and a reheater section 32.

At least one control valve 34 is disposed on the high pressure turbine element 14 and controls the flow of high pressure, high temperature steam into the high pressure turbine element 14.

Under normal operating conditions, the path of the steam in the nuclear steam power plant 12 is illustrated by arrows 36. The steam emerges from the primary steam generator section 30 and passes through the main turbine stop valve 10, through the control valve 34, and into the high pressure turbine element 14. The steam is permitted to expand through the high pressure turbine element 14, through the arrays of stationary and rotating blades 38 disposed therein, and does useful work in turning the shaft 18 to produce mechanical energy.

The steam is discharged from the high pressure turbine element 14 into the reheater section 32. Steam discharged from the reheater 32 passes through a turbine intercept valve 40 and then to the inlet of the low pressure turbine 16. This simple flow path illustrated by arrows 36 does not include many conventional elements of steam power plant, as these other elements such as feedwater heaters and lubricating systems have been omitted for clarity, but are well known to those skilled in the art.

The steam expands through low pressure turbine element 16, then through a diffuser section into the condenser 24. The condensate from the condenser 24 flows through the boiler feed pumps 26 and is reintroduced into the primary steam generator section 30.

The turbine stop valve 10 is connected to the shaft 18 by electrical and hydraulic control leads 42. The turbine stop valve 10 has as its primary function the isolation of the high pressure turbine element 14 from the steam generator section 28. The turbine stop valve 10 responds to a predetermined signal from a turbine control system (not shown) whenever any one of a variety of system failures, such as sudden loss of the electrical load 22 or an essential turbine service, requires shutdown of the system 12.

If the associated electrical load 22 is suddenly removed from the system, and the steam supplied to the high pressure turbine elements 14 is not interdicted, an overspeed condition occurs. If left unchecked, turbine overspeed would cause the rotating elements of the turbine to destroy themselves due to excessive centrifugal forces, destroying not only the rotating elements but the stationary turbine elements as well.

In order to prevent an overspeed condition from causing this damage, the turbine stop valve 10 quickly interdicts the supply of steam from the steam generator 30 to the high pressure turbine element 14. Steam within the turbine element 14 downstream from the turbine stop valve 10 is trapped by the quickly closing intercept valve 40 to prevent an overspeed condition due to steam flow through both turbine elements 14 and 16.

Figure 2:
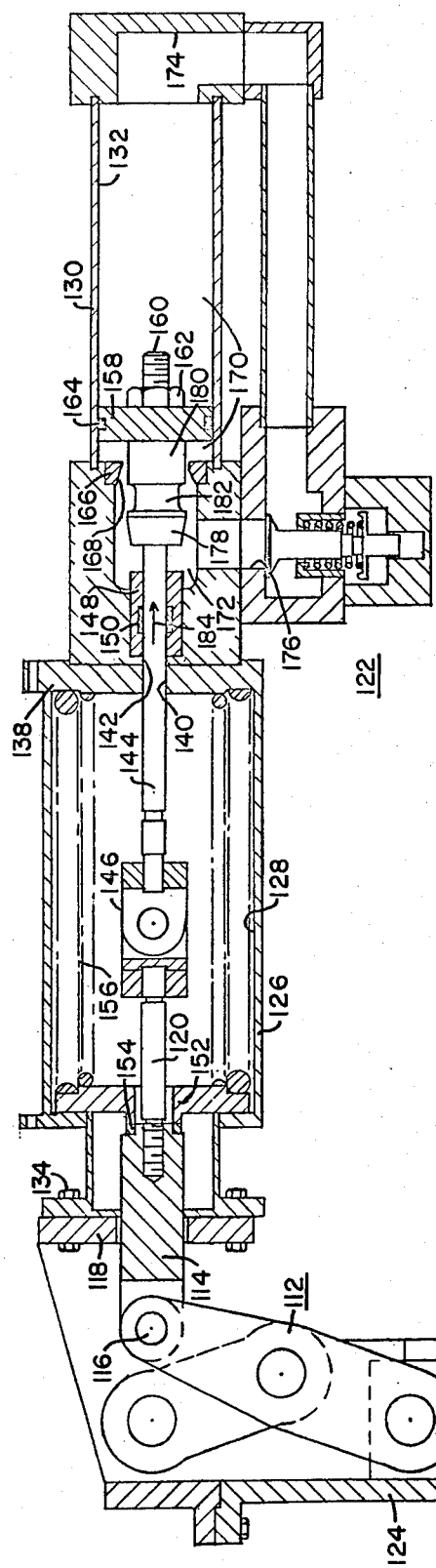
FIG. 2 is an elevational view, entirely in section, showing a combined turbine throttle-stop valve embodying the teachings of this invention in the seated position.
Figure 2:
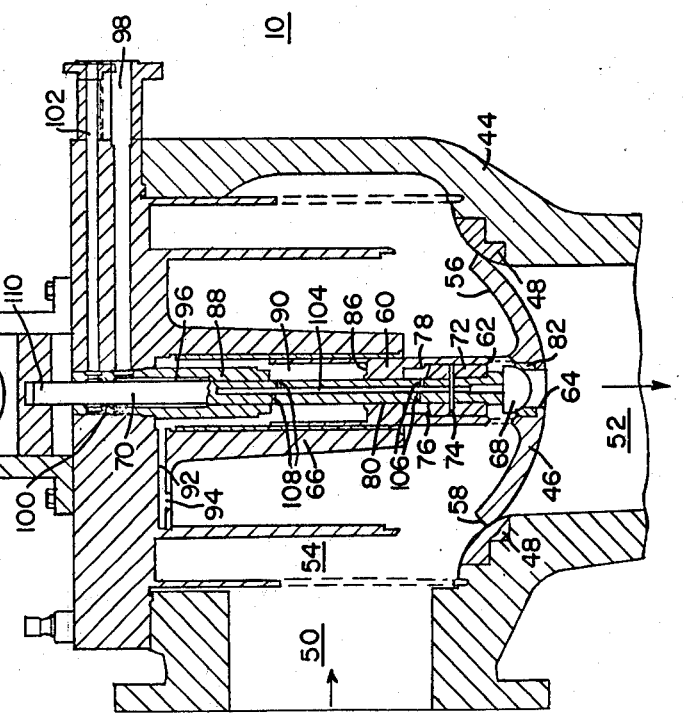

Referring now to FIG. 2, an elevational view, entirely in section, of the turbine stop valve 10 having a throttle capability constructed according to the teachings of this invention is illustrated. The valve 10 is disposed between the steam generator section 30 and the high pressure turbine element 14 (FIG. 1).

The valve 10 is comprised of a body member 44 having a flexible main plug member 46 movably disposed from a seated or closed position illustrated in FIG. 2 to an open position. When seated, the main valve plug 46 abuts against a main valve seat 48 disposed within the body member 44. An inlet port 50 and an outlet port 52 are disposed within the body member 44. A main inlet cavity 54 is defined by the interior of the body member 44 and communicates with the inlet port 50.

The flexible main plug 46 is a substantially hemispherical plug member, the interior surface 56 of which defines a substantially hemispherical volume. A frustoconical surface 58 extends circumferentially about the exterior of the main plug 46 adjacent the rim thereof. A valve embodying a flexible, substantially hemispherical plug member is disclosed in the Mar. 22–23, 1971, "Engineering Presentation to the Power Generation Committee of the Association of Edison Illuminating Companies," prepared by Westinghouse Electric Corporation.

The interior surface 56 and the frustoconical surface area 58 communicates with and are exposed to the pressure of the influent pressurized fluid at the inlet port 50 when the main valve plug member 46 is in the seated position.

A hollow, substantially cylindrical shank member 60 is attached to the interior surface 56 of the main plug member 46. The interior of the hollow shank member 60 communicates with the main inlet cavity 54 through an opening 62.

The hollow shank member 60 is attached to the main plug member 46 so as to circumferentially surround an opening 64 which is disposed centrally and axially through the main plug member 46. The shank member 60 is movably disposed within a plug guide 66. The plug guide 66 is a cylindrical projection extending axially through the interior of the body member 44.

A pilot plug 68 is disposed coaxially within the hollow shank member 60 and has an elongated stem 70 attached thereto. The pilot plug 68 regulates the flow of steam to the high pressure tubine element 14 while the high pressure turbine element 14 is coming up to a predetermined synchronous speed, thus providing a throttle capability to the stop valve 10 embodying the teachings of this invention.

The stem 70 is attached to a shank guide 72 by a pin 74. The pilot plug 68, the stem 70, and the shank guide 72 attached to the pilot plug 68 by the pin 74 are movably disposed within the substantially pressure-tight shank 60. The shank guide 72 has an upper surface 76 which corresponds to an inner surface 78 of the shank 60. The elongated stem 70 passes through an opening 80 in the shank member 60 and extends centrally and axially through the interior of the body member 44. The pilot plug 68 is movably disposed within the hollow shank 60 from a first seated position illustrated in FIG. 2 to an open position. When seated, the pilot plug 68 abuts a pilot plug seat 82 disposed circumferentially about the interior of the opening 64 in the main plug member 46, thereby blocking the opening 64 disposed in the main plug member 46.

The interior of the hollow shank member 60 defines a first substantially pressure-tight chamber 84 between the surface 76 of the shank guide 72 and the interior surface of the hollow shank 60.

The plug guide 66, the topmost exterior surface 86 of the hollow shank 60 and a bushing 88 defines a second chamber 90.

The second chamber 90 is kept at the same pressure as the pressure of the inlet cavity 54 by suitable means, such as a narrow, annular chamber 92 which communicates with the second chamber 90 and introduces pressurized fluid from the inlet cavity 54 before the second chamber 90 through a passage 94. The second chamber 90 therefore contains a fluid maintained at a high pressure.

A third chamber 96 is defined by the interior of the bushing 88 and is maintained at a pressure much lower than the pressure within the second chamber 90 yet still above atmospheric pressure. Suitable means, comonly a first leakoff passage 98 connected to a low pressure zone (not shown) maintains the pressure within the third chamber 96 at the desired level. A guide bushing 100 extends circumferentially about the elongated stem 70 as the elongated stem 70 passes through the third chamber 96. A second leakoff passage 102 is connected to a gland condenser (not shown). Any steam leakage from the third chamber 96 past the guide bushing 100 is drawn into the gland condenser. The gland condenser, and hence the second leakoff passage 102, is maintained at a pressure below atmospheric pressure. Thus, steam leakage from the third chamber 96 and out of the body 44 is effectively prevented by use of the second leakoff passage 102 and the gland condenser (not shown).

Disposed centrally and axially through a portion of the elongated pilot stem 70 is an axial bore 104. The bore 104 communicates with the first pressurized chamber 84 through a first pair of radial passages 106. The first radial passages 106 are disposed on the elongated stem 70 at a predetermined position so that the axial bore 104 communicates with the first shank chamber 84 at all times. The first radial passages 106 are at all times located within the first shank chamber 84.

A second pair of radial passages 108 is disposed on the elongated stem 70 a predetermined axial distance from the first pair 106 of radial passages. The radial passages 108 communicates with the third, low pressure chamaber 96 during a predetermined portion of the closing stroke of the pilot valve 68. However, during a second predetermined portion of the closing stroke of the pilot valve 68, the second pair of radial passages 108 communicate with the second high pressure chamber 90.

As will become apparent herein, the pressurized chambers 84, 90 and 96, in cooperative association with the axial bore 104, first radial passages 106 and the second radial passages 108, provides means for holding the pilot plug 68 to the main plug 46 while the main plug 46 moves from the open position to the seated position.

The second end 110 of the elongated stem 70 is connected to one terminus of a variable force angle linkage 112. The linkage 112 is disclosed and claimed in U.S. Pat. No. 3,684,237, issued to G. F. Hyde and R. W. LeGates, and assigned to the assignee of the present invention. The second terminus of the linkage 112 is connected to a connecting rod 114 by suitable means, such as a pin 116. The connecting rod 114 passes with a large clearance through a plate 118. The connecting rod 114 is connected to a swing linkage 120.

An actuator and closing spring assembly 122 is connected to the body member 44 of the stop valve 10 through a support assembly 124. The actuator and closing spring assembly 122 has, as one of its functions, the opening and holding-open both the flexible main valve plug 46 and the pilot valve plug 68 by utilization of a pressurized hydraulic holding force. In addition, the actuator and closing spring assembly 122 provides a resisting hydraulic dashpot action during a fast closing emergency operation of the valve 10. The actuator and closing spring assembly 122 also responds to a predetermined signal from the turbine control means (not shown) to release the holding force and permit a closing force exerted by a biasing means, commonly a spring, to move the flexible main valve plug 46 and the pilot plug 68 to the seated position.

The actuator and spring assembly 122 comprises a first cylindrical body member 126 having a spring chamber 128 therein and a second cylindrical body member 130 having a pressure-tight actuator chamber 132 therein. The first body member 126 having the spring chamber 128 therein is attached to the support member 124 by suitable attachment means, such as bolt 134. The first body member 126 has a first plate member 138 integral therewith. The plate member 138 has an opening 140 therein. The plate member 138 serves as a mounting platform on which the second body member 130 is attached to the first body member 126. The second body member 130 is closed at one end thereof and has an opening 142 which aligns with the opening 140 in the plate member 138.

An elongated shaft 144 extends through the aligned openings 140 and 142 and is connected to the swing link 120 by a coupling 146 within the spring chamber 128. The opening 142 in the second body member 130 is lined with a guide bushing 148 and has a packing seal or O-ring 150 to maintain the pressure-tight feature of the actuator chamber 132. A spring retainer 152 is connected to the swing link 120 by a spherical connector 154. The shaft 144 is thus connected to the variable linkage 112 through the coupling 146, the swing link 120, the connecting rod 114 and the pin 116. The linkage 112 is in turn connected to the second end 110 of the elongated stem 70.

A spring 156 is disposed within the spring chamber 128 between the plate member 138 and the spring retainer 152. The spring 156 exerts a bias force which, when transmitted to the elongated stem 70, tends to close the associated valve plugs 46 and 68. A piston 158 is attached near the second end 160 of the shaft member 144 by suitable means, such as a threaded connection 162. The piston 158 is movably disposed within the substantially pressure-tight chamber 132 of the actuator body member 130. A piston ring 164 maintains a sealed relationship between the piston 158 and the interior of the pressure-tight body member 130.

A separator 166 is disposed circumferentially about the interior of the second body member 130 of the actuator and closing spring assembly 122. The separator 166 has a central axial opening 168 of a predetermined diameter extending therethrough. The diameter of the separator 166 is of a substantially larger dimension than the diameter of the shaft 144. The separator 166 divides the pressure-tight body member 130 of the actuator and closing spring assembly 122 into a first compartment 170 and a second compartment 172.

A hydraulic fluid completely fills both the first compartment 170 and the second compartment 172 of the pressure-tight chamber 132 of the actuator assembly 122. A channel 174 communicates with the interior of the first compartment 170 and a channel 176 communicates with the interior of the second compartment 172. The channel 174 leads to a hydraulic fluid reservoir (not shown).

Attached to the shaft 144 is a first snubber 178 and a second snubber member 180, the second snubber 180 being adjacent to the piston 158. A predetermined axial distance 182 extends between the first snubber 178 and the second snubber 180.

The diameter of the snubbers 178 and 180 is substantially greater than the diameter of the shaft 144, but a close clearance is provided between the snubbers 178 and 180 and the opening 168 in the separator 166.

As seen in FIG. 2, both the first snubber 178 and the second snubber 180 are disposed within the second compartment 172 of the pressure-tight actuator chamber 132 while the main valve plug 46 and the pilot plug 68 are in the seated position.

It is thus seen that when the valve 10 is closed, no high pressure, high temperature steam from the main body cavity 54 of the valve 10 can pass through the outlet port 52 and into the high pressure turbine element 14.

During normal operation of the nuclear steam power plant 12 (FIG. 1), the turbine stop valve 10 is in the normally open position. While in the open position both the main plug 46 and the pilot plug 68 disposed within the hollow shank portion 60 are away from their respective plug seats 48 and 82. At this time, the spring 156 is in the compressed state, and both first snubber 178 and second snubber 180 are in the first compartment 170 of the actuator chamber 132. Steam flow through the valve 10 provides the motive fluid to the high pressure turbine 14 and the low pressure turbine 16 during normal operation of the power plant 12.

Whenever the associated electrical load 22 (FIG. 1) is suddenly removed or any other turbine abnormality occurs, rapid shutdown of the system is required. When the turbines 14 and 16 begin to overspeed, the turbine control means (not shown) releases the holding force transmitted through the hydraulic fluid and exerted against the piston 158. With this holding force released, the force of the spring bias 156 impels the main valve plug 46 and the pilot plug 68 toward the closed position.

During such an overspeed condition, it is imperative that the valve 10 seat within a predetermined time. In the nuclear steam power plant 12 (FIG. 1), with the large volumes of high pressure, high temperature steam involved, it is especially imperative that the stop valve be a fast-operating valve. In the valve described by the teachings of this invention, the total time from initiation of closing stroke until seating of both valve plugs 46 and 68 is 200 milliseconds. The diameter of the main plug 46 is 28 inches and is fabricated of alloy steel. The pilot plug 68 is attached, through the stem 70, to an even more massive external linkage 112 and to the moving parts of the actuator and spring assembly 122. It is obvious that when these two valve plugs with such large moving masses are closed in a relatively small time increment, high impact energies and velocities result. It is essential that means for absorbing the high impact energies generated by the rapid closing of the massive valve 10 and means for dampening the high velocities of the valve plugs 46 and 68 be provided.

Since the main valve plug 46 is flexible, it is able to deflect to absorb the high impact energies attendant upon seating of the main valve plug 46 to the plug seat 48. In addition, the main valve plug 46 also deflects to absorb impact energies when the pilot valve 68 later impacts against the pilot valve seat 82 disposed on the main valve plug 46, the high impact energies attendant on rapid closing of the main valve plug 46 and the pilot plug 68 can be absorbed without incurring stress damage to the main valve plug 46 or to the main valve seat 48 and the pilot valve seat 82.

The double snubber arrangement comprising the first snubber 178 and the second snubber 180 provides effective means for damping the high impact velocities created by a rapid closing of the stop valve 10. Upon receipt of a predetermined signal from the turbine control system (not shown), the holding force on the piston 158 is relieved, and the bias spring 156 exerts a force tending to move the main plug 46 and the pilot plug 68 towards the seated position. This force of the bias spring 156 is transmitted to the elongated stem 70 attached to the pilot plug 68.

Since the pilot plug 68 and the elongated stem 70 are disposed coaxially and centrally through the main plug shank 60, means for holding the pilot plug 68 to the main plug 46 at the shank 60 are provided so that movement of the stem 70 will close both the pilot plug 68 and the main plug 46 without relative motion between the two plugs during the closing stroke of the main valve plug 46.

At startup of the system, the valve 10 is in the seated position, as illustrated in FIG. 2, with the flexible main valve plug 46 abutting the main valve plug seat 48 and the pilot plug 68 abutting the pilot plug seat 82. With both valve plugs 46 and 68 in the seated position, no steam flow can pass from the inlet port 50 to the outlet port 52.

On a predetermined signal from turbine control (not shown), hydraulic fluid from the fluid reservoir (not shown) is introduced into the second compartment 172 of the pressure-tight actuator chamber 132 through channel 176. The hydraulic fluid introduced into the second compartment 172 of the pressure-tight actuator chamber 132 exerts a force acting on the piston 158 in the direction 184. The force of the hydraulic fluid in the piston 158 causes the piston 158 to move in the direction 184 against the force of the bias spring 156.

The force exerted on the piston 158 is transmitted through shaft 144, coupling 146, swing link 120, the connecting rod 114 and the linkage 112 to the elongated stem 70. Thus, the force exerted on the piston 158 by the hydraulic fluid is effectively transmitted to the elongated stem 70 of the pilot valve plug seat 82.

Withdrawal of the pilot valve plug 68 from the pilot valve plug seat 82 permits the high pressure, high temperature steam to pass from the inlet port 50 through the openings 62 and 64 to the outlet port 52 of the valve 10. Passage of steam through the valve 10 prior to unseating of the main valve plug 46 provides the valve 10 with a throttling capability, enabling the pilot plug 68 to control steam flow to the turbines (FIG. 1) until 80% of the synchronous speed is reached.

Figure 3:
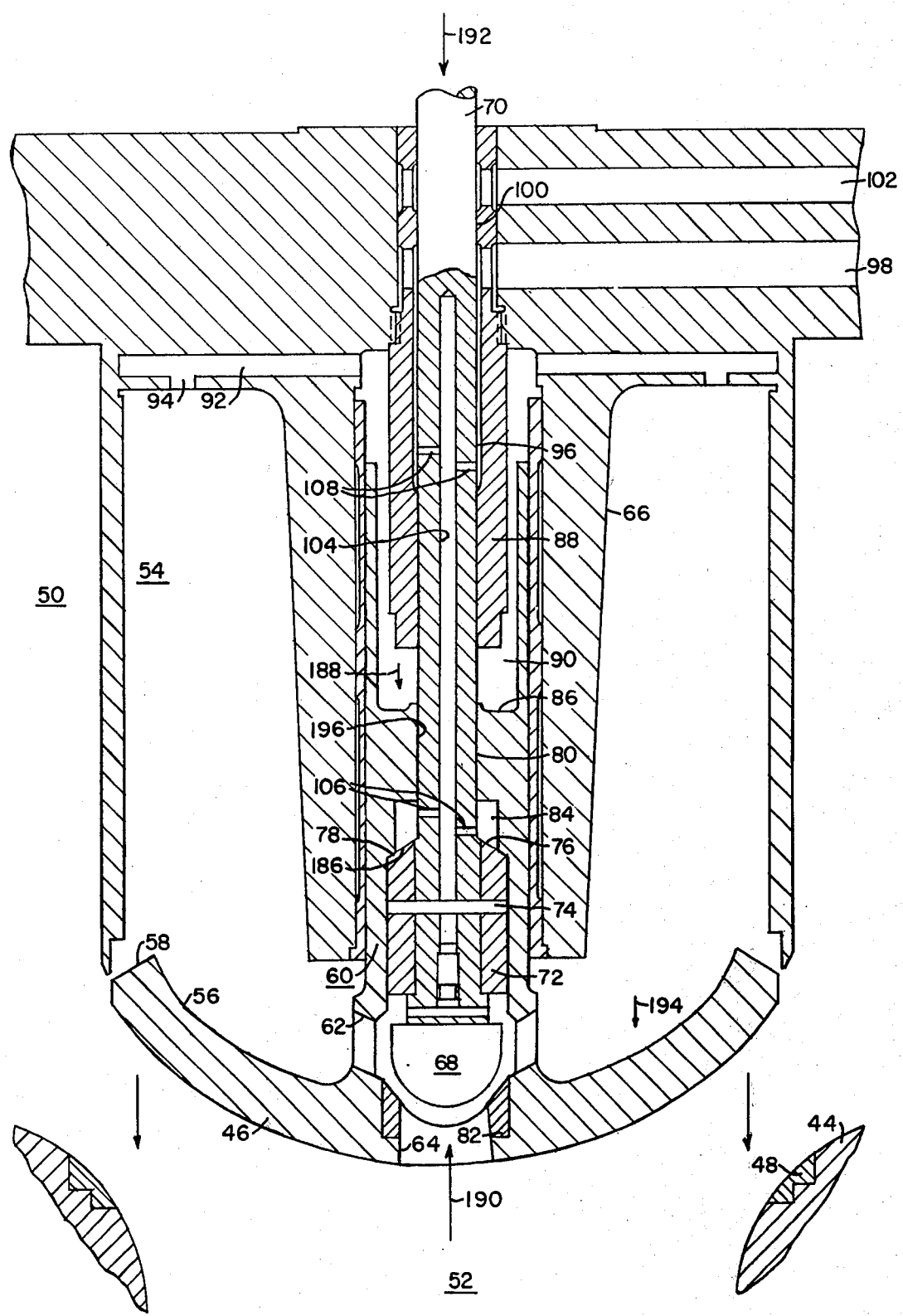
FIG. 3 is an expanded elevational view, entirely in section, showing a portion of of a combined turbine throttle-stop valve embodying the teachings of this invention in the open position.

Referring now to FIG. 3, a view of a portion of the valve 10 in the open position is shown. The pilot valve plug 68 lifts from its pilot valve plug seat 82 and moves within the shank 60 until the upper surface 76 on the shank guide 72 abuts against the inner surface 78 of the shank 60. The abutment of the surfaces 76 and 78 is illustrated at 186 in FIG. 3. With the abutment 186 between surfaces 76 and 78 extant, the pilot valve plug 68 is in the backseat position within the shank 60. Any further movement of the piston 158 in direction 184 will be transmitted to the pilot valve plug 68 and the main valve plug 46 will be lifted from the main valve plug seat 48. Continued movement of the piston 158 in direction 184 in response to the hydraulic fluid introduced into the pressure-tight actuator chamber 132 will move the main valve plug 46 and the pilot plug 68 to the full, open position.

In FIG. 3, when the valve plugs 46 and 68 are in the open position, it is noted in conjunction with FIG. 2 that the first shank chamber 84 communicates with the third low pressure chamber 96 through the first radial passages 106, the axial bore 104 and the second radial passages 108.

It is obvious that communication between the third low pressure chamber 96 and the first shank chamber 84 introduces a low pressure level within the first shank chamber 84. Since the second high pressure chamber 90 is kept at a high pressure by means of the chamber 92 and passage 94, a large pressure differential exists between the second high pressure chamber 90 and the first shank chamber 84. With this high pressure differential between the aforementioned chambers, a force is exerted on the topmost external surface 86 of the hollow shank 60 in a direction indicated by arrow 188. In addition, a force in the direction of arrow 190 is exerted beneath the pilot plug 68. The forces 188 and 190 tend to keep the surface 78 of the shank 60 abutting against the surface 76 of the shank guide 72, thus maintaining the abutment 186 between the corresponding surfaces 76 and 78.

It is thus seen that as the elongated stem 70 starts the downward stroke in response to the force exerted by the spring bias 156, the shank 60, and therefore the main plug 46, will remain attached to the pilot plug 68. Upon a predetermined emergency trip signal from the turbine control (not shown), the holding force in the direction 184 on the piston 158 is released. When this occurs, the spring 156 produces a closing force acting on the valve plugs 46 and 68 in a direction 192 which overcomes the initial inertia of the massive system to close the valve 10. As one combined plug unit of the main plug 46 and the pilot plug 68 move from the open position, a pressure force due to the pressure of the influent fluid at the inlet port 50 is exerted on the internal surface 56 and the frustoconical surface 58 on the main plug 46 which assists in moving the main plug 46 toward the seated position. The direction of the force on these exposed portions of the main plug 46 is indicated by reference numeral 194.

It is apparent that the combined force on the spring bias 156 and the force of the influent steam 194 move the main valve plug 46 rapidly closed. Concommitant with the high velocity, a high energy impact can be expected when the main valve plug 46 seats on the main valve seat 48 disposed in the body member 44.

However, since the main valve plug 46 is a flexible member, it deflects to absorb the high impact energy occasioned by the quick-closing stroke of the main valve plug 46 and thus reduce the impact reaction at seat 48 to an acceptable level, so that no damage occurs to seating surfaces.

Since the elongated stem 70 moves relative to the bushing 88, the second pair of radial passages 108 passes from the third low pressure chamber 96 and be blocked by bushing 88. It is to be understood that this occurs at a predetermined portion of the closing downstroke of the valve 10 shortly after main valve plug 46 leaves the backseat. During this period of the downstroke, the pressure in the first shank chamber 84 rises, due to leakage from the second high pressure chamber 90 through a narrow clearance space 196 between the shank 60 and the stem 70.

Figure 4:
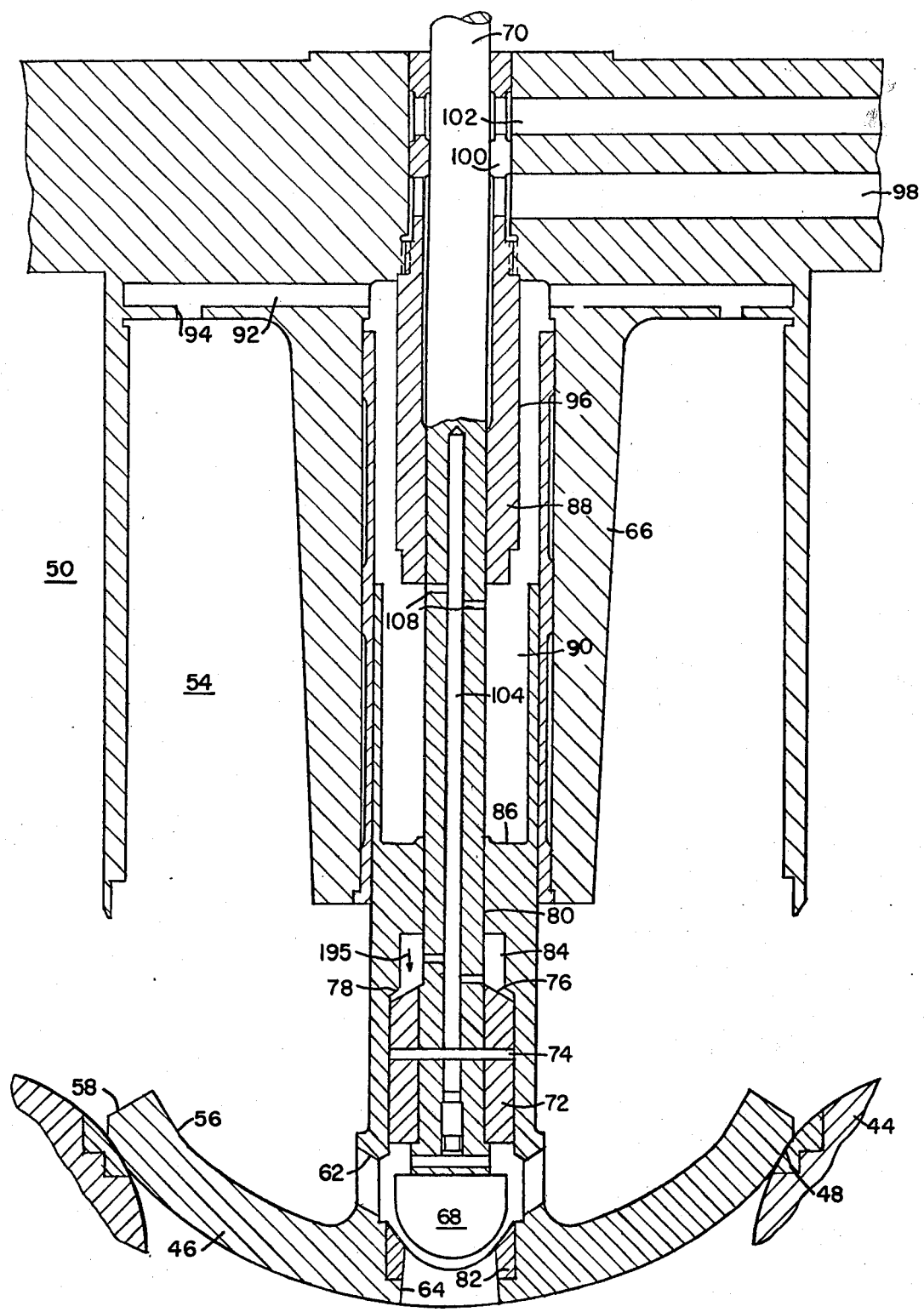
FIG. 4 is a view similar to FIG. 3, showing a portion of a combined turbine throttle-stop valve with the main valve plug in the seated position.

Referring now to FIG. 4, a view similar to FIG. 3, showing a portion of the valve 10 with the main valve plug 46 in the seated position and the pilot plug 68 not yet seated is illustrated. In FIG. 4, the second pair of radial passages 108 is shown communicating with the second high pressure chamber 90. When the shank chamber 84 and the second high pressure chamber 90 communicate, the pressure in the first shank chamber 84 undergoes a rapid rise since the first shank chamber communicates with the second high pressure chamber 90 through the first radial passages 106, the central bore 104, and the second radial passages 108.

This rapid rise in pressure within the first shank chamber 84 produces a substantially zero pressure differential between the second high pressure chamber 90 and the first shank chamber 84. The pressure within the first chamber 84 is then substantially equal to the pressure below the pilot plug 68. Since the pressure in the second high pressure chamber 90 is substantially equal to the pressure in the main body cavity 54, and since the pressure in the main body cavity 54 is greater than the pressure beneath the pilot plug 68, there is either no pressure differential or a small pressure differential between the pressure in the shank chamber 84 and the pressure under pilot plug 68, causing a force 195 on the pilot plug 68 which combines with the force of the spring bias 156 to seat the pilot plug 68. The high impact energy of the pilot plug 68 seating is absorbed by a deflection in the flexible main plug member 46.

Although high impact energies of plug seating are absorbed by the deflection of the flexible valve plug 46, the high velocities of the moving main valve 46 and the pilot plug 68 must also be slowed to prevent damage to the body 44.

Figure 5:
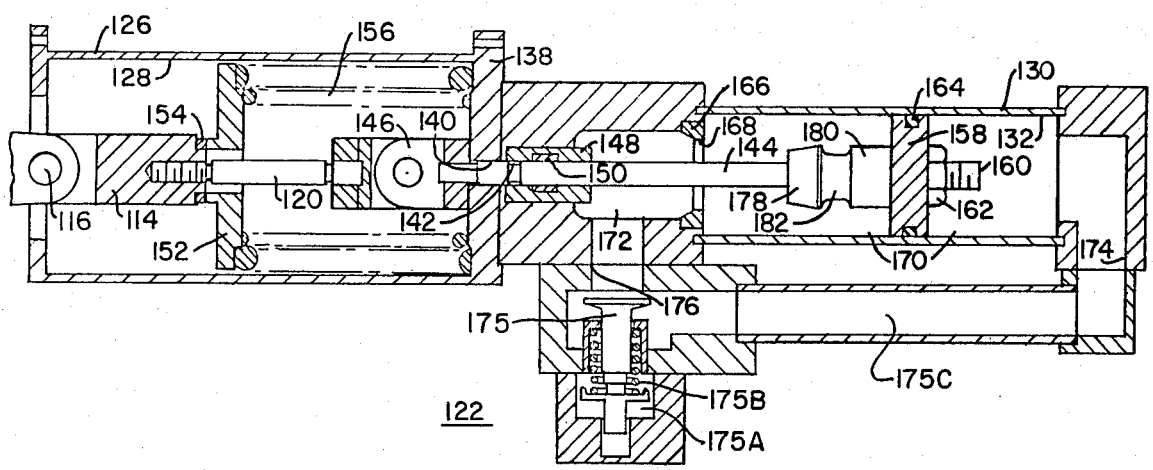
FIG. 5 is an expanded elevational view, entirely throttle-stop section, showing a portion of a combined turbine throttlestop valve embodying the teachings of this invention with the valve in the open position.

Referring now to FIG. 5, a view of actuator and closing spring assembly 122 is illustrated with both valve plugs 46 and 68 in the open position. When the valve plugs 46 and 68 are open, the first and second snubbers 178 and 180 are both completely disposed within the first compartment 170 in the pressurized chamber 132 of the actuator assembly and closing spring assembly 122. The spring 156 in the compressed state, and the force exerted by the hydraulic fluid on the piston 158 is in direction 184 transmitted through the linkage 112 to the elongated stem 70 to keep the upper surface 76 of the shank guide 72 of the pilot plug 68 abutting against the inner surface 78 of the shank 60.

As was stated previously, upon start-up of the turbine system 12, or after repair of breakdown, the turbine control system re-establishes a force on the piston 158 in the direction 184 by forcing hydraulic fluid into the second compartment 172 of the actuator 132 through the channel 176. The hydraulic fluid exerts a force in the direction 184 against the piston 158, causing the piston 158 to move in the direction 184 against the direction of the force exerted by the spring bias 156.

Movement of the piston 158 in a direction 184 is transmitted to the elongated stem 70 by the linkage 112, and the pilot plug 68 is withdrawn from the pilot plug seat 82 and moves toward the abutting backseated position within the hollow shank 60 where the abutment 186 (FIG. 3) between the surface 76 of the shank guide 72 and the corresponding surface 78 of the shank 60 is established. When backseating of the pilot plug 68 occurs, further motion in the direction 184 by the piston 158 exerts a force transmitted by the linkage 112 to the elongated stem 70, and the elongated stem 70 lifts the main valve plug 46 from its seated position.

When the piston 158 moves to its extreme position within the pressurized actuator chamber 132, the pilot valve 68 and the main valve 46 are both in the open position illustrated in FIG. 3. When the valve 10 is in the open position, the flow of high pressure, high temperature steam from the steam generator 28 to the high pressure turbine elements 14 (FIG. 1) passes through the inlet port 50, through the main body cavity 54 and through the outlet port 52 of the turbine stop valve 10.

Figure 6:
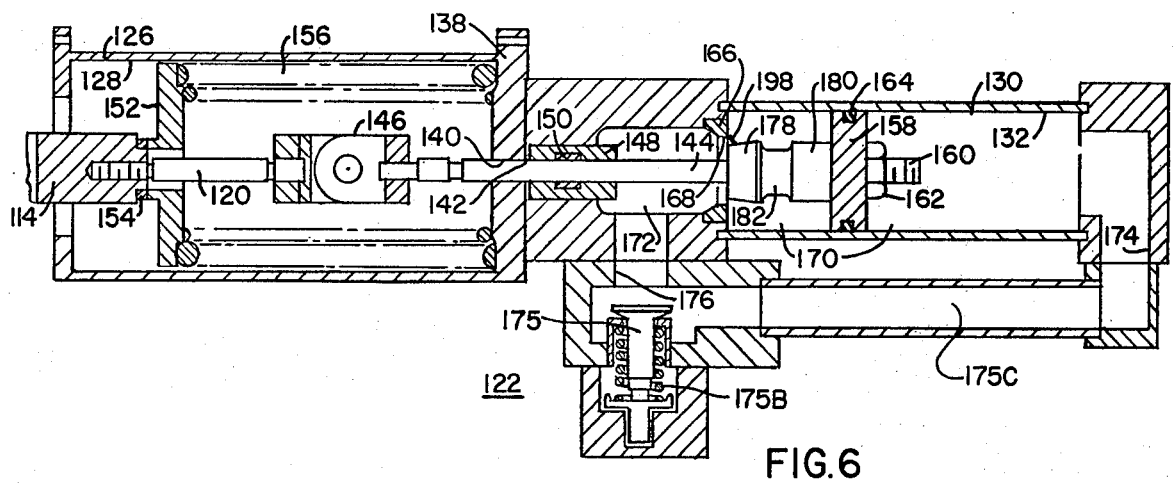
FIG. 6 is a view similar to FIG. 5 illustrating a portion of the combined turbine throttle-stop valve with the main valve plug seated.

Referring now to FIG. 6, the means for damping the high velocity of the main valve plug 46 is illustrated. As was mentioned previously, when the main valve plug 46 and the pilot plug 68 are in the open position, the first snubber 178 and the second snubber 180 are both disposed within the first compartment 170 in the pressurized chamber 132 in the actuator and closing spring assembly 122.

As the pressure force on the piston 158 is withdrawn by the turbine control means (not shown) and the force of the closing spring 156 becomes dominant, the first snubber 178 moves toward the opening 168 in the separator 166.

The control means (not shown) has, as an element thereof, a valve 175. The valve 175 normally occupies a seated position so as to isolate the orifice 176 and the left hand portion of the chamber 170 from the orifice 174 and the right hand portion of the chamber 170. The valve 175 is held in its normally seated position against its seat by a force exerted thereon by a pressurized fluid disposed in a chamber 175A underneath the stem and spring retainer of the valve 175. The pressure within the pressurized fluid is controlled by the external control system, and exerts an upward force (in FIG. 5) on the valve 175, which overcomes a downward bias force exerted by a spring 175B, to hold the valve 175 in its seated position.

Figure 7:
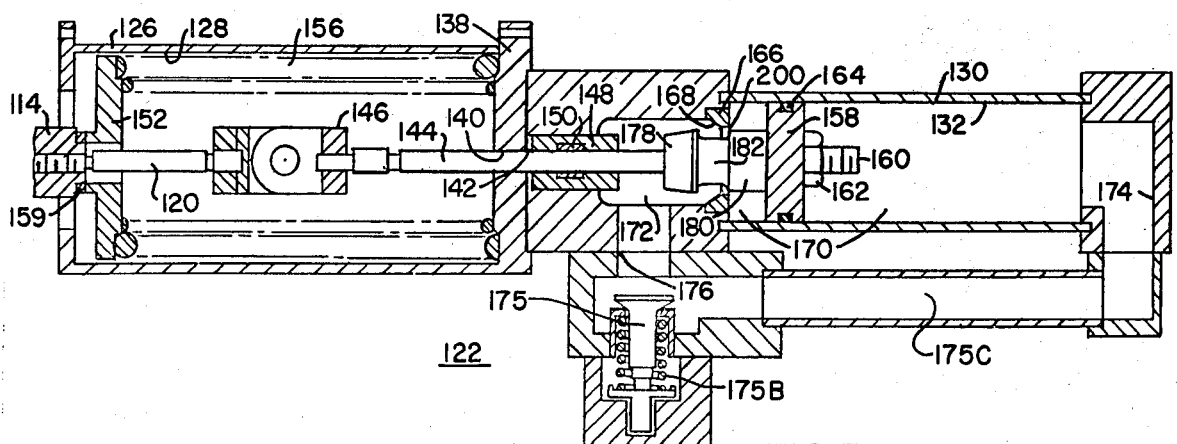
FIG. 7 is a view, similar to FIG. 5, showing a portion of a combined turbine throttle-stop valve embodying the teachings of this invention with the pilot valve approaching the closed position.

As the turbine control means (not shown) withdraws the pressure in the fluid in the chamber 175A, the downward bias force of the spring 175B becomes dominant and valve 175 moves away from its normally seated position. As seen in FIG. 5, the valve 175 is just away from the seat disposed about the orifice 176. In FIGS. 6 and 7, the valve 175 is shown as being almost completely backseated.

Upon opening of the valve 175, the orifice 176 communicates through the external passage 175C with the orifice 174. The fluid in the left hand side of the piston 158 may be forced through the orifice 176, through the passage 175C and the orifice 174, into the right hand side of the piston 158. Alternatively, the orifice 176 may be connected to an external drain, depending upon the configuration of the control system chosen.

By judiciously locating the first snubber 178 on the shaft 144, the first snubber 178 becommes adjacent to the opening 168 in the separator 166 as the main valve plug 46 approaches the main valve seat 48. Since the diameter of the shaft 144 is much less than the diameter of the opening 168, the shaft 144 moves relatively quickly in the axial direction through the opening 168 of the separator 166 within the actuator chamber 132.

However, when the larger diameter of the first snubber 178 approaches the opening 168 in the separator 166, the hydraulic fluid disposed within the pressurized chamber 132 can no longer quickly flow through the narrowing orifice 198 between the first snubber 178 and the opening 168 in the separator 166. This back-up of the hydraulic fluid within pressurized chamber 132 provides a damping effect to limit the velocity of the main plug member 46 as the main plug member 46 seats.

By judicious spacing of the first snubber 178 on the shaft 144, it is possible to have the diminution effect of the first snubber 178 limit the velocity of the main plug 46 at a time substantially coincident to the seating of the main valve plug 46. The dampening of the seating of the main valve plug 46. The dampening of the velocity by the first snubber 178 combined with the impact-absorbing deflection of the main valve plug 46 insures that excessive damage to the body member 44 of the plug 10 does not occur when the main plug 46 is seating.

After the first snubber 178 has passed through the opening 168 in the separator 166 and enters the second compartment 172 of the actuator chamber 132, the position of the stem 70 exposes the second radial passages 108 to the high pressure chamber 90. This releases the holding force in the main plug 46 and permits the force of the spring 156 to accelerate the pilot plug 68 toward the seated position, as was explained in connection with FIGS. 3 and 4.

At this point, in the actuator assembly chamber 132, the axial length 182 on the shaft 144 between the first snubber 178 and the second snubber 180 is passing through the opening 168 in the separator 166. Since the diameter of the axial length 182 is substantially less than the diameter of the opening 168, the velocity of the pilot plug 68 is not dampened.

By judiciously axially spacing the second snubber 180 a predetermined distance from the first snubber 178, the second snubber 180 approaches the opening 168 in the separator 166 substantially coincident to the approach of the pilot plug 68 to the pilot seat 82.

Referring now to FIG. 7, since the diameter of the second snubber 180 is substantially larger than the diameter axial length 182 on the shaft 144, and since the diameter of the opening 168 provides a close clearance between the second snubber 180 and the opening 168, the hydraulic fluid within the pressurized chamber 132 cannot escape rapidly between the narrowing orifice 200 between the second snubber 180 and the separator 166. This back-up of hydraulic fluid dampens the velocity and slows the pilot plug 68. The combination of the damping of the velocity by the second snubber 180 and the deflection of the main valve plug 46 prevents damage to the main valve plug 46 upon the seating of the pilot plug 66.

When both valve plugs 46 and 68 have been seated on their respective valve seats 48 and 82, both snubbers 178 and 180 are disposed within the second compartment 172 in the pressure-tight actuator chamber 132, as illustrated in FIG. 2.

It is thus seen that utilization of a valve embodying the teachings of this invention, provides suitable means for damping and slowing the high velocities of the main valve plug 46 and the pilot plug 68 caused by the quick-closing stroke.

By judiciously placing the first snubber 178 on the shaft 144, the damping effect of the first snubber 178 and the opening 168 in the second separator 166 will slow the velocity of the main plug 46, thus preventing damage to the valve body 44 caused by a high impact velocity of the main valve 46.

By judiciously spacing the second snubber 180 at a predetermined axial distance 182 from the first snubber 178, the high velocity of the pilot plug 68 can be slowed to prevent any damage to the main plug 46 due to the seating of the pilot plug 68.

I claim:

1. A damping arrangement for a valve having a movable plug having a predetermined velocity, said arrangement comprising:

a casing having a fluid therein;

a separator within said casing, an opening of a predeterminedd dimension extending through said separator;

connector means extending through said opening, said connector means attached to the movable plug;

means for forming said fluid within siad casing toward said opening to said separator;

a first snubber attached to said connector, said first snubber having a dimension less than the dimension of said opening, a second snubber attached to said connector means a predetermined distance from said snubber, said second snubber having a predetermined dimension less than the dimension of said opening;

said fluid forced toward said opening in said separator by said forcing means being compressed against said separator by said first snubber as said first snubber approaches said opening, the compression of said fluid damping the velocity of said movable plug;

said fluid forced toward said opening in said separator by said forcing means being compressed against said separator by said second snubber as said second snubber approaches said opening, the compression of said fluid further damping the velocity of said movable plug.

2. The device of claim 1, wherein
said connector means comprises an elongated shaft extending through said opening in said separator, said first and said second snubbers each being a radially outward flaring member mounted on said shaft, the diameter of said first and said second snubber being less than the dimension of said opening.

3. The device of claim 2, wherein said plug comprises a main plug member movable at a first predetermined velocity and a pilot plug member movable at a second predetermined velocity, said main plug member and said pilot plug member both attached to said connector means, the compression of said fluid by said first snubber against said separator damping the velocity of said main plug member, the compression of said fluid by said second snubber damping the velocity of said pilot plug member.

4. A valve device comprising:

a body member having an inlet port and an outlet port therein;

a flexible main plug movably disposed within said body member, said main plug being movable at a predetermined rectilinear velocity;

a pilot plug movably disposed within said body member, said pilot plug being movable at a predetermined rectilinear velocity;

means for closing said main plug;

means for closing said pilot plug; and, daming means for damping the velocity of said main plug and the velocity of said pilot plug, said damping means comprising a cylindrical casing having a fluid disposed therein;

a separator disposed about the interior of said casing, said separator having a central opening extending therethrough;

a shaft extending through said opening in said separator, said shaft being connected to said first closing means and to said second closing means;

a piston movably disposed within said cylinder casing and connected to said shaft, said piston forcing said fluid toward said opening in said separator as said main plug and said pilot plug are closed;

a first snubber attached to said shaft;

a second snubber attached to said shaft a predetermined distance from said first snubber;

said fluid forced toward said opening in said separator by said piston being compressed against said separator as said first snubber approaches said opening, the compression of said fluid damping the velocity of said main plug;

said fluid forced toward said opening in said separator by said piston being compressed against said separator as said second snubber approaches said opening, the compression of said fluid damping the velocity of said pilot plug.

5. The device of claim 4 wherein said opening in said separator has a predetermined diameter, said shaft is an elongated member having a predetermined diameter, and said first snubber and said second snubber each being a radially outward flared member, each of said snubbers having a predetermined diameter greater than the diameter of said shaft but less than the diameter of said opening in said separator.

6. The device of claim 5, wherein said first snubber and said second snubber are attached coaxially to said shaft.

7. The device of claim 6, wherein said second snubber is mounted on said shaft adjacent to said piston.

* * * * *